P. BLASZKO.
SHADE HANGER.
APPLICATION FILED DEC. 13, 1918.
1,306,463.
Patented June 10, 1919.
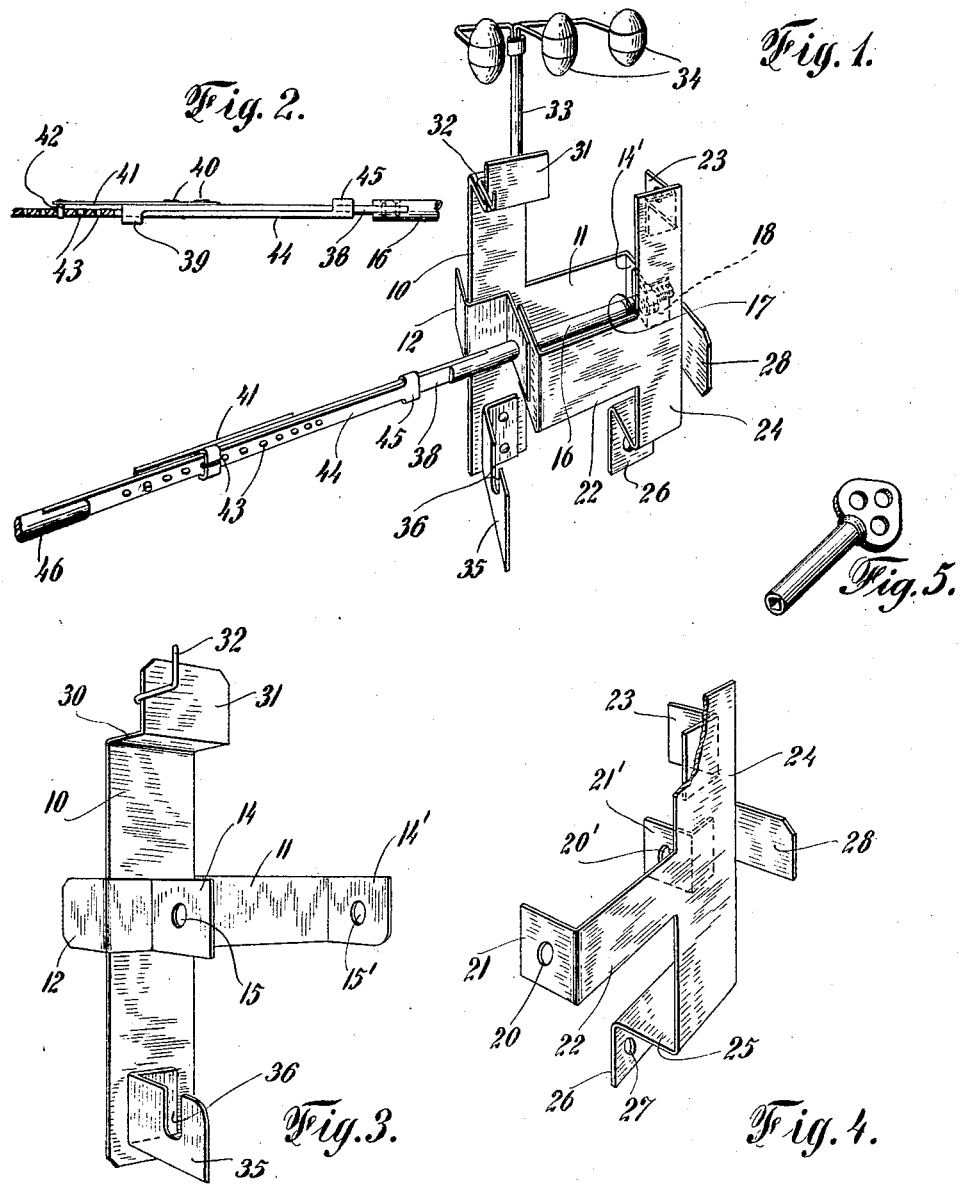
INVENTOR
Piotr Blaszko.
BY
ATTORNEY

UNITED STATES PATENT OFFICE.

PIOTR BLASZKO, OF DETROIT, MICHIGAN.

SHADE-HANGER.

1,306,463. Specification of Letters Patent. Patented June 10, 1919.

Application filed December 13, 1918. Serial No. 266,581.

*To all whom it may concern:*

Be it known that I, PIOTR BLASZKO, a citizen of Russia, residing at Detroit, county of Wayne, and State of Michigan, have invented certain new and useful Improvements in Shade-Hangers, of which the following is a specification.

This invention relates to improvements in shade hangers and has as its special object the provision of means whereby the usual shades, curtains, portières and the like may be suspended from the front of a window in a convenient and practical manner.

A further object is to produce a pair of hangers which may be attached to the window frame without defacing or damaging the same materially, and finally, to produce hangers which are adjustable to various widths of window frames.

These and other like objects are attained by the novel construction and combination of parts hereinafter described and shown in the accompanying drawings, forming a material part of this disclosure, and in which—

Figure 1 is a perspective view showing a single hanger and an adjustable rod engaged therewith.

Fig. 2 is a fragmentary side elevational and longitudinal sectional view of the support rod extending between the hangers.

Fig. 3 is a perspective view of one of the hanger elements, and,

Fig. 4 is a similar perspective view showing the other hanger element.

Fig. 5 shows in perspective view a key.

Referring to the drawings, a horizontal flat bar 10 has secured to it a transverse flat bar 11, either by soldering, riveting, or like fastening means, the bar 11 having a rearwardly turned lug 12 adapted to be engaged upon the inner side of the window frame in an obvious manner.

Projecting outwardly from the transverse bar 11 are two plates respectively 14 and 14' and having holes 15 and 15' engageable with which is a cylindrical rod 16 having a screw threaded end 17 engageable with the nut 18, this rod also passes through openings 20 and 20' formed in rearwardly turned extensions 21 and 21' of another transverse bar 22, thereby permitting the bar 22 to move relatively to the bar 11 by manipulating the nut 18 or the key shown in Fig. 5 engageable with the end of rod 16 in an obvious manner so as to draw the lug 12 tightly against the inner side of the window frame, while a corresponding lug 23, formed with or secured to a vertical bar 24 extending from the transverse bar 22, makes contact against the outer side of the window frame, thereby clamping the brackets securely in position and irrespective of the width of this window frame.

Also extending downwardly from the vertical bar 24 is an inturned element 25 having a downturned portion 26 in which is an opening 27 through which may be passed a screw or like securing means whereby the bracket element may be rigidly engaged with the front of the window frame.

In order to prevent the drapery from extending past the brackets, an outturned element 28 extends from the end of the transverse bar 22, thereby maintaining the draperies from extending outwardly beyond the extreme edge of the brackets.

Formed with the vertical bar or plate 10, at its upper end, is an element 30 having an outwardly turned portion 31 parallel with the front of the bar 10 and secured to the element 31 is an upwardly turned pin 32 adapted to maintain a common curtain pole or the like in an obvious manner, while extending above is a vertical support 33 carrying ornaments 34.

Also, at the bottom of the bar 10 is a bracket element 35 containing an open vertical recess 36 receptive of the end of an ordinary curtain pole thereby avoiding the necessity of separate brackets for the same.

Extending outward from the rod 16 is a thin flat bar 38 formed at its outer ends with an engaging clasp 39, and secured by the rivet 40 upon its outer surface is a spring plate 41 at the end of which is secured a pin 42 engageable in any of the plurality of perforations 43, formed in a mating bar 44, having at its outer end a similar engaging clasp 45 partially inclosing the bar 38 but allowing the two bars to slide longitudinally, one with reference to the other, except as the pin 42 is entered into any of the perforations 43.

The bar 44 is rigidly engaged to the main portion of the connecting rod 46 which extends from one side of the window to the other, the same engaging at its other end with a similar constructed bracket. Therefore due to the perforations and the spring pin engaging therein, the brackets may be adjusted without cutting or difficulty to any width of window whatever.

Having thus described my invention what

I claim as new and desire to secure by Letters Patent, is—

In a window shade hanger, the combination with a pair of brackets, engaging elements formed with each of said pair of brackets, a jointed bar passing through said engaging means, a nut thereon whereby said elements may be clamped upon the frame of a window, means formed with said elements for supporting draperies, means for preventing the draperies from moving outward beyond the window frame, an adjustable support rod engaged with bar, said rod being formed in sections, one of said sections having a plurality of perforations in its length, and a spring arm formed with the other of said sections engageable in any of said perforations.

In testimony whereof I have affixed my signature.

PIOTR BLASZKO.

Copies of this patent may be obtained for five cents each, by addressing the "Commissioner of Patents, Washington, D. C."